(12) United States Patent
Giraud et al.

(10) Patent No.: US 7,410,703 B2
(45) Date of Patent: Aug. 12, 2008

(54) METHOD FOR PRODUCTION OF A SEALED COATING FOR SURFACES OF BUILDINGS COMPRISING A CROSS-LINKED SEALED SILICONE MEMBRANE, ADHESIVE AND READY-TO-USE KIT FOR APPLICATION OF SAID METHOD

(75) Inventors: Yves Giraud, Sainte Foy les Lyon (FR); Sylvie Michiels, Venissieux (FR)

(73) Assignee: Henkel AG & Co. KGaA, Dusseldorf (DE)

( * ) Notice: Subject to any disclaimer, the term of this patent is extended or adjusted under 35 U.S.C. 154(b) by 328 days.

(21) Appl. No.: 10/481,502

(22) PCT Filed: Jul. 1, 2002

(86) PCT No.: PCT/FR02/02286

§ 371 (c)(1),
(2), (4) Date: Jul. 6, 2004

(87) PCT Pub. No.: WO03/002677

PCT Pub. Date: Jan. 9, 2003

(65) Prior Publication Data

US 2004/0234786 A1    Nov. 25, 2004

(30) Foreign Application Priority Data

Jun. 29, 2001 (FR) .................... 01 08695

(51) Int. Cl.
*B32B 9/04* (2006.01)
(52) U.S. Cl. ...................................... 428/447
(58) Field of Classification Search ................... 428/447
See application file for complete search history.

(56) References Cited

U.S. PATENT DOCUMENTS

| 4,584,341 | A | * | 4/1986 | Huebner et al. | ............. 524/837 |
| 4,863,985 | A | * | 9/1989 | Pouchol et al. | ............. 524/183 |
| 5,045,231 | A | * | 9/1991 | Braun et al. | ................. 516/66 |
| 5,066,520 | A | * | 11/1991 | Freiberg et al. | ............. 427/379 |
| 5,286,318 | A |   | 2/1994 | Sims et al. | |
| 5,366,807 | A | * | 11/1994 | Fey | ......................... 428/425.5 |
| 5,624,607 | A | * | 4/1997 | Kanai et al. | ................. 252/606 |
| 5,639,539 | A | * | 6/1997 | DeProspero et al. | ..... 428/195.1 |
| 5,973,061 | A | * | 10/1999 | Feder et al. | ................. 524/588 |
| 6,197,377 | B1 | * | 3/2001 | Boogaard | ................... 427/299 |
| 6,703,089 | B2 | * | 3/2004 | DeProspero et al. | ..... 428/32.76 |

FOREIGN PATENT DOCUMENTS

| DE | 23 50 410 A | 4/1975 |
| EP | 0 040 459 A | 11/1981 |
| EP | 0 212 790 A | 3/1987 |
| EP | 0 248 443 A | 12/1987 |
| FR | 2 753 708 A | 3/1998 |
| GB | 2 056 473 A | 3/1981 |

* cited by examiner

*Primary Examiner*—Margaret G Moore
(74) *Attorney, Agent, or Firm*—Buchanan, Ingersoll & Rooney, P.C.

(57) ABSTRACT

The invention relates to a method for production of a sealed surface coating, for buildings (floor/wall/ceiling), of the type where a series of layers, or elements are fixed on the surface, comprising, starting from the surface, optionally at least one primer adhesive layer, at least one watertight polymer membrane, (optionally at least one woven or non-woven fibrous material layer), at least one layer of adhesive and at least one external cover, characterised in that (a) the sealed membrane is chosen from those which may be obtained from a an aqueous dispersion of silicone oil(s), (b) the adhesive applied comprises at least one adhesion promoter (C'), (c) the aqueous dispersion of silicone oil(s) is applied as a film to the surface, (d) the cross-linking of the silicone layer occurs subsequently, preferably at an ambient temperature, (e) the application of at last one layer of adhesive with added adhesion promoter (C') is then applied, preferably by surface coating on the cross-linked silicone film and finally the external cover is applied.

11 Claims, No Drawings

METHOD FOR PRODUCTION OF A SEALED COATING FOR SURFACES OF BUILDINGS COMPRISING A CROSS-LINKED SEALED SILICONE MEMBRANE, ADHESIVE AND READY-TO-USE KIT FOR APPLICATION OF SAID METHOD

The field of the invention is that of silicone compositions that can cure by crosslinking and can be used especially as mastics or any other sealant, or for forming waterproof elastomeric linings, applicable by coating or spraying (e.g. paints, semi-thick and flexible coatings).

More precisely, the invention relates to the production of an impermeable lining to be laid on the surface of floors, walls or ceilings of buildings. These linings will be called hereafter "surface linings". In particular, the linings referred to here are intended to be laid in wet areas or rooms. Conventionally, these linings include, as external covering, ceramic tiles, tiles made of mineral material included in a resin matrix or in a cement matrix, or concrete tiles.

Apart from this external covering, for example tiling, the lining involved in the present invention is formed by a superposition of layers comprising, starting from the surface to be lined:
optionally, at least one layer of adhesion primer;
at least one water-impermeable polymeric membrane;
optionally, at least one sheet of woven or nonwoven fibrous material, for reinforcement;
at least one layer of adhesive; and
the external covering, for example tiling.

In this kind of surface lining, an impermeable membrane, consisting of a flexible and deformable polymer film, is interposed between the external covering, namely for example the tiling, and the surface (screed) to be coated so as to form a seal.

These impermeable polymeric membranes, below tiling, for example, have the purpose of sealing the construction in wet rooms or areas (showers, bathrooms, kitchens, ponds, swimming pool surrounds, etc.).

It is important that this impermeable polymeric membrane be able to adhere to all the surfaces encountered in the building field (concrete, metals, wood, and others), that it be strong, that it fulfill its sealing function reliably and lastingly over time and that it allow adhesion, to its outer surface, of the adhesive for the external covering, for example the tiling.

Floor linings for wet rooms or areas are already known that consist of a superposition of layers comprising, starting from the surface to be lined:
an adhesion primer film covering the surface of the floor, wall or ceiling;
a first membrane made of an acrylic (co)polymer or of a vinyl monomer/diene copolymer such as, for example, a styrene/butadiene copolymer, usually an acrylic (co)polymer;
a reinforcing sheet made of nonwoven fibrous material (for example a polyester fiber mat);
a second membrane made of an acrylic (co)polymer or a vinyl monomer/diene copolymer such as, for example, a styrene/butadiene copolymer, usually an acrylic (co)polymer;
a layer of adhesive; and finally
the external covering, for example ceramic tiles.

These known multilayer structures, which include membranes obtained from for example an acrylic latex, have a number of drawbacks.

Firstly, these impermeable acrylic polymer membranes are not water-resistant just after they have been applied. Thus, water present in the work environment will disturb the crosslinking/curing of the acrylic polymer films. As a result, their mechanical properties and their water-barrier properties may be impaired thereby.

Impermeable membranes made from organic polymers suffer from another major drawback, this being their lack of elasticity. Once laid, they therefore have a tendency to crack in such a way that they no longer fulfill their primary function of sealing. To alleviate this, it is necessary to insert, into the superposition of the constituent layers of the lining, at least one sheet of a fibrous reinforcing material. It is clear that this operation goes counter to the aim of simplifying the method of producing the lining, for example for a tiled floor.

In addition, these organic polymer membranes, for example under tiles, have the drawback of not being "breathing". This is because they form just as much an air barrier as a water barrier, so that all the conditions propitious for the growth of fungi are created.

Another drawback of these constituent layers or superpositions of such surface linings that include impermeable organic polymer membranes results from the very long waiting times, for curing/crosslinking to take place, that it is necessary to observe between each coating layer of organic polymer. These waiting times further increase the overall time of the method for constructing the surface lining when the latter includes at least two organic polymer sealing membranes.

All this also complicates the task of the operator who is producing these surface linings.

Moreover, the known constructions of surface linings that include organic polymer sealing membranes require the use of adhesion primers on all the surfaces, in order to achieve correct adhesion to the latex membranes and to the tiling on the surface to be lined. Such a routine coating with primers slows down the method of manufacturing surface linings.

As regards this state of the art, one of the essential objectives of the present invention is to remedy the drawbacks of the surface linings (for example those having an external covering made of tiles) of the prior art, in particular in terms of water resistance, simplicity of implementation and reduction of laying time.

Another essential objective of the invention is to provide a method of producing an impermeable surface lining for buildings (floors/walls/ceilings) in which the number of layers, and therefore the number of operations requiring labor, is limited.

Another essential objective of the present invention is to propose a method of producing an impermeable surface lining for buildings (floors/walls/ceilings) in which the intermediate polymer sealing membrane possesses mechanical properties, in particular elasticity, allowing it to withstand mechanical stresses over time and thus obviate the use of a fibrous reinforcing mat in the superposition of layers constituting the surface lining.

Another essential objective of the invention is to propose a method of producing an impermeable surface lining for buildings (floors/walls/ceilings) in which the polymeric sealing membrane is obtained in a simple and practical manner, from an aqueous polymer dispersion that can be easily applied, for example using a brush or a roller.

Another essential objective of the invention is to propose a method of producing an impermeable surface lining for buildings (floors/walls/ceilings) in which it is conceivable, for certain surfaces, to dispense with the preliminary step of applying an adhesion primer.

Another essential objective of the invention is to provide a method of producing an impermeable surface lining for buildings (floors/walls/ceilings) in which the adhesion between the lining and the surface (concrete screed or wood surface for example), as well as the adhesion between the adhesive introduced between the external covering (for example in tiling) and the sealing membrane, is as good as possible.

Another essential objective of the invention is to provide a method of producing an impermeable surface lining for buildings (floors/walls/ceilings) in which the sealing membrane(s) used is/are not subject to the problem of water pick-up and is not sensitive to water, in particular a short time (about three hours) after it has been coated in order to form a crosslinked/cured polymer film.

Another essential objective of the invention is to propose a method of producing an impermeable surface lining for buildings (floors/walls/ceilings) in which the durations of the labor operations and the waiting times are reduced.

Another essential objective of the invention is to provide a method of producing an impermeable surface lining for buildings (floors/walls/ceilings) for obtaining good adhesion to wet surfaces and involving products that do not have environmentally harmful effects and that do not by their nature sully the tools and the equipment used for applying them, in a manner such that it is difficult and demanding to clean them.

Another essential objective of the invention is to provide an adhesive for permeable surface linings for buildings (floors/walls/ceilings) that can be employed for implementing the method used (for example, a tiling adhesive).

Another essential objective of the invention is to provide a ready-to-use kit for implementing the abovementioned method, and comprising in particular:
  an aqueous silicone dispersion allowing a crosslinked impermeable film to be obtained rapidly and easily; and, optionally
  an adhesive for the external covering (for example tiling); or even the external covering (for example tiling).

These objectives, among others, are achieved by the present invention, which relates firstly to a method of producing an impermeable surface lining for buildings (floors/walls/ceilings), of the type of those consisting in fixing, to the surface, a superposition of layers or of elements comprising, starting from the surface to be coated:
  optionally, at least one layer of adhesion primer;
  at least one water-impermeable polymeric membrane;
  (optionally, at least one sheet of woven or nonwoven fibrous material);
  at least one layer of adhesive;
  at least one external covering;

characterized in that:
  a. the impermeable membrane is selected from those that can be obtained from an aqueous dispersion of silicone oil(s) comprising:
    -A- 100 parts by weight of at least one organopolysiloxane oil (A) that can crosslink by condensation, if necessary in the presence of a crosslinking agent (B), made of an elastomer,
    -A'- optionally, up to 30 parts by weight of at least one unreactive organopolysiloxane oil,
    -B- if necessary, from 0.1 to 100 parts by weight of at least one crosslinking agent (B),
    -C- optionally, up to 50 parts by weight of at least one adhesion promoter (C),
    -D- up to 200 parts by dry weight of at least one filler (D),
    -E- a catalytically effective amount of a catalytic curing compound (E), possibly up to three parts by weight,
    -F- at least one emulsifier (F),
    -G- optionally, at least one functional additive (G) and
    -H- water;

b. the adhesive employed includes at least one adhesion promoter (C');
  c. the aqueous silicone oil(s) dispersion is applied as a film to the surface;
  d. the crosslinking of the silicone film then takes place, preferably at room temperature;
  e. at least one layer of adhesive, to which the adhesion promoter C' has been added, is then applied, preferably by coating it onto the crosslinked silicone film; and then, finally
  f. the external covering is laid.

According to this method, an aqueous silicone dispersion is used which makes it possible to obtain a sealing membrane that makes the surface linings water-resistant only three hours after it has been applied.

In addition, the impermeable silicone membrane produced in this method according to the invention possesses mechanical properties that are markedly superior to the organic (e.g. acrylic) sealing membranes encountered in the known systems and requiring the use of reinforcing layers, take time to lay.

The method according to the invention also has the major advantage of significantly reducing the time to produce impermeable surface linings and of reducing the number of operating phases.

Another advantage, associated with use, in the method according to the invention, of silicone elastomer sealing membranes stems from the fact that these silicone elastomer membranes form a barrier impermeable to water but permeable to air, thereby making it possible to limit the proliferation of fungal growths.

It is particularly beneficial to have, in addition, particularly short drying times and therefore process times whenever the surface linings in question are for outdoors (patio or flat roof). In addition, the method according to the invention makes it possible to achieve good adhesion to wet surfaces.

Also employed in this method are silicone products that are environmentally friendly and allow easy removal, by washing with water, of soiling of the tools used for applying them.

Finally, on account of the elasticity provided by the silicone sealing membrane, it is possible to carry out the method according to the invention on surfaces that are liable to undergo small movements.

The fact of using at least one adhesion promoter C' in the adhesive is an important provision of the invention, which makes this adhesive compatible with the impermeable silicone membrane that is produced by the coating and crosslinking/curing of the aqueous silicone dispersion.

According to a noteworthy feature of the invention, the amount of adhesion promoter C' in the adhesive is less than 20% relative to the total weight of the composition constituting the adhesive, preferably between 0.1 and 15% by weight and more preferably still between 0.5 and 10% by weight.

This adhesive for an external covering of the tiling type for example is advantageously prepared by mixing a powder part with a liquid dispersant, preferably water. The adhesion promoter C' is preferably incorporated into the liquid dispersant before mixing.

In practice, the adhesive used in the method according to the invention is a cement-based adhesive with a specific binder. Its high mechanical strength and flexibility make it particularly suitable for bonding, for example, ceramic, stone or concrete tiles.

According to a preferred way of implementing the method according to the invention, the adhesive used has the following composition (in parts by weight in the composition):

| | |
|---|---|
| hydraulic cement | 100 |
| mineral binder with organic or inorganic additive(s) | 100-300 |
| preferably | 170-200 |
| adhesion promoter (C') (by dry weight) | 1-50 |
| preferably | 20-40 |
| water | 20-100 |
| preferably | 40-80 |

In this composition, the hydraulic cement is advantageously a conventional cement containing mainly the $Ca_2SiO_4$ and $Ca_3SiO_5$ (metastable) calcium silicates. It may for example be Portland cement.

With regard to the mineral binder, this comprises at least one compound selected from the group including: siliceous sands, cellulose derivatives, calcareous fillers, acrylic resins in dispersion form, specific adjuvants and mixtures thereof.

According to a preferred feature of the invention, the adhesion promoter C' is identical to C.

From the practical standpoint, it should be pointed out that the adhesive can be prepared by mixing a powder based on hydraulic cement with mineral binder (with organic or inorganic additive(s)), water and adhesion promoter (C'). As powder is very suitable, mention may be made, for example, of the mix sold by BAL under the name BAL-SINGLE PART FLEXIBLE.

Again from the practical standpoint, it should be pointed out that the preparation of the adhesive is very advantageously carried out by mixing 70 to 90% by weight of powder, 5 to 20% by weight of water and 2 to 10% by weight of adhesion promoter (percent by weight in relation to the total mass of the composition comprising the powder, the water and the dry promoter).

From the qualitative standpoint, the adhesion promoter C and/or C' is a water-soluble compound capable of being dissolved in water at a temperature of 25° C. in an amount of at least 5% by weight, and chosen from silanes and/or hydroxylated POSs carrying, per molecule, at least one hydroxyl group and at least one hydrophilic substrate-anchoring functional group ($F_{sa}$), and from mixtures of these products, said $F_{sa}$ functional groups, which are identical or different from one another, preferably being selected from the group comprising the following functional groups: amino, epoxy, acrylo, methacrylo, ureido, mercapto, thiol and chloroalkyl.

More precisely, the adhesion promoter C or C' is advantageously:
a linear hydroxylated polydiorganosiloxane having D and/or MD siloxyl units and/or a hydroxylated POS resin comprising T and optionally M and/or D and/or Q siloxyl units or else Q and M and/or D and/or T siloxyl units, preferably a resin selected from those of the T(OH), DT(OH), DQ(OH), DT(OH), MQ(OH), MDT(OH) and MDQ(OH) type or mixtures thereof; and/or
a functionalized silane having as formula:

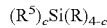

in which formula:
c is 0, 1 or 2;
the radicals $R^5$, which are identical or different, correspond to the radicals $R^3$ and $R^4$ of the oil (A) of formula (I) as defined below; and
the radical R corresponds to the OH group of the polyorganosiloxane oil (A) of formula (I) as defined below.

The siloxyl units M, D, T and Q used in the above description of the adhesion promoter are defined as follows:

unit $M=R^o{}_3SiO_{1/2}$
unit $D=R^o{}_2SiO_{2/2}$
unit $T=R^oSiO_{3/2}$
unit $Q=SiO_{4/2}$.

The radicals R are identical or different and correspond to a hydrocarbon radical such as, for example, an alkyl (e.g. methyl, ethyl, isopropyl, tert-butyl and n-hexyl), hydroxyl or alkenyl (e.g. vinyl or allyl) radical or else an $F_{sa}$ functional group. The adhesion promoter (C) or (C') are therefore POSS, silicone resins and/or silanes each carrying at least one hydroxyl group and at least one $F_{sa}$ group linked to at least one Si atom.

Preferably, the $F_{sa}$ groups are nonsalified aminoalkyl groups containing 1 to 6 carbon atoms of general formula:

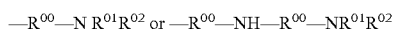

$R^{oo}$=divalent hydrocarbon residue, for example —$(CH_2)_n$—

$R^{o1}$, $R^{o2}$: corresponding independently to H, $C_nH_{2n+1}$
Free valency: linked to the Si.

As an illustration of a very suitable adhesion promoter (C) in (C'), mention may be made of the POS resin obtained from hydrolyzed δ-aminopropyltriethoxylsilane and subjected to "stripping" of the ethanol formed by the hydrolysis. The polyhomocondensed resin obtained is a mixture of oligomers containing from 4 to 10 silicons and comprising units:
T(OH)=$R^oSi(OH)O_{2/2}$
T=$R^oSiO_{3/2}$
T(OH)$_2$=$R^oSi(OH)_2O_{1/2}$
T(OH)$_3$=$R^oSi(OH)_3$.

these units being respectively present in a decreasing amount and $R^o$=$NH_2(CH_2)_3$—. This is, for example, an aminated T(OH) resin.

In practice, the adhesion promoters, C or C', are silicone compounds for modulating the physico-chemical properties of the silicone elastomer compositions obtained after crosslinking the dispersions employed in the method according to the invention.

With regard to the silicone phase of the dispersion according to step a) of the method of the invention, and in particular the essential constituent or constituents of this silicone phase, namely the oil (A), this is advantageously selected from α,ω-hydroxylated oils or functional oils comprising, per molecule, at least two condensable functional groups, possibly after hydrolysis.

More precisely still, these oils (A) may be represented by the following generic formula (I):

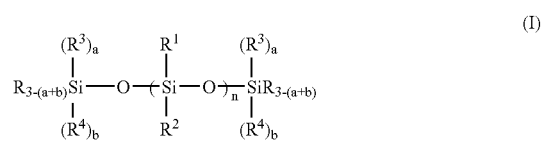

in which formula:
a is 0 or 1;
b is 0 or 1;
with a+b=0, 1 or 2;
n has a value high enough to give the polymer of formula (a) the desired viscosity;
the R radicals are identical or different and represent:
an OH group with a+b=2,
an alkoxy or alkenyloxy group containing from 1 to 10 carbon atoms, an aryloxy group containing from 6 to 13 carbon atoms,
an acyloxy group containing from 1 to 13 carbon atoms,
a ketiminoxy group containing from 1 to 8 carbon atoms
or
an amino-functional or amido-functional group containing from 1 to 6 carbon atoms, linked to the silicon via an Si—N bond;

the $R^1$ and $R^2$ radicals are identical or different and represent alkyl or alkenyl aliphatic organic groups having from 1 to 10 carbon atoms, phenyl aromatic groups, said groups being optionally substituted with halogen atoms or cyano groups;

the $R^3$ and $R^4$ radicals are identical or different and represent alkyl, aminoalkyl, polyaminoalkyl, epoxyalkyl or alkenyl aliphatic organic groups containing from 1 to 13 carbon atoms, or aryl aromatic groups containing from 6 to 13 carbon atoms;

at least two condensable functional groups, optionally after hydrolysis, being present per molecule of at least 80% of the $R^1$ to $R^4$ radicals representing a methyl group.

As examples of R radicals, mention may be made of:
alkoxy groups, such as, for example methoxy, ethoxy or octyloxy;
alkenyloxy groups, such as for example vinyloxy, hexenyloxy and isopropenyloxy;
an aryloxy group such as, for example, phenyloxy;
an acyloxy group such as for example, acetoxy;
a ketiminoxy group such as, for example, $ON=C(CH_3)C_2H_5$;
aminofunctional groups such as, for example, ethylamino and phenylamino; and
an amidofunctional group such as, for example, methylacetamido.

Among the abovementioned aliphatic or aromatic organic radicals, mention may be made as regards:
$R^1$, $R^2$: for example, methyl, ethyl, octyl, trifluoropropyl, vinyl and phenyl groups;
$R^3$, $R^4$: for example, methyl, ethyl, octyl, vinyl, allyl and phenyl groups;
—$(CH_2)_3$—$NH_2$; —$(CH_2)_3$—$NH$—$(CH_2)_2$—$NH_2$.

As specific examples of D units, namely $R^1R^2SiO_{2/2}$, that are present in the oil (A), mention may be made of:
$(CH_3)_2SiO_{2/2}$; $CH_3(CH_2=CH)SiO_{2/2}$; $CH_3(C_6H_5)SiO_{2/2}$; $(C_6H_5)_2SiO_{2/2}$.

As specific examples of M units, namely $RR_3R_4SiO_{1/2}$, mention may be made of:
$(CH_3)_2(OH)SiO_{1/2}$; $(OCH_3)_3SiO_{1/2}$; $[O—C(CH_3)=CH_2]_3SiO_{1/2}$ $[ON=C(CH_3)]_3SiO_{1/2}$; $(NH—CH_3)_3SiO_{1/2}$; $(NH—CO—CH_3)_3SiO_{1/2}$.

It is important to note that a silicone oil A of specific nature and viscosity was selected.

This is because the dynamic viscosity of the oil (A) (and therefore in general of the silicone phase) is greater than or equal to 10 Pa·s, preferably greater than or equal to 50 Pa·s and more preferably greater than or equal to 70 Pa·s. This viscosity is an important parameter of the invention. All the viscosities involved in the present description correspond to a 25° C. dynamic viscosity value (called Newtonian dynamic viscosity), that is to say the dynamic viscosity that is measured in a known manner at a shear rate low enough for the measured viscosity to be independent of the shear rate (Brookfield viscometer; AFNOR NFT 76106 standard of May 1982).

The optional unreactive oils (A') may meet the same definition as that given above for the reactive oils (A), except that they do not include reactive functional groups. The oils (A') therefore cannot chemically crosslink. In this regard, they are inert and may, for example, act as a diluent and/or a means of regulating the rheology.

As examples of oils (A'), mention may be made of polydimethylsiloxane oils having a viscosity at 25° C. ranging from 50 to 10 000 mPa·s.

A crosslinking agent (B) is preferably used when the oil (A) is an α,ω-(dihydroxy)polydiorganosiloxane polymer. Many crosslinking agents may be used in amounts that depend on their nature; these are well known to persons skilled in the art. Given below, as examples, is a list of crosslinking agents with the recommended corresponding amounts expressed in parts by weight per 100 parts of oil (A):

0.5 to 10 parts of sodium silicate;
0.1 to 15 parts of an alkali metal organosiliconate (European patent EP-A-266 729);
1 to 100 parts of a silsesquioxane resin microemulsion (U.S. Pat. Nos. 3,355,406 and 3,433,780);
5 to 100 parts of a reactive silicone resin of low molecular mass, having alkoxy and acyloxy groups (U.S. Pat. No. 4,554,187);
5 to 100 parts of a silicone resin of high mass, insoluble in toluene (EP-A-304 719);
5 to 100 parts of a hydroxylated silicone resin consisting of units of formulae $R'_3SiO_{1/2}(M)$ and/or $R'_2SiO_{2/2}(D)$, these being joined to units of formulae $R'SiO_{3/2}(T)$ and/or $SiO_2(Q)$, R' being mainly a $C_1$-$C_6$ alkyl radical, a vinyl radical and 3,3,3-trifluoropropyl radical, and a weight content of hydroxyl groups of between 0.1 and 10%. Among these resins, mention may most particularly be made of MQ, MDQ, MDT and TD resins (FR-A-2 638 166);
1 to 20 parts of a silane or formula: $(R'')_u SiX_{(4-u)}$ in which formula R" is a monovalent organic radical, in particular a methyl or vinyl, u is equal to 1 or 0, and X is a condensable and/or hydrolysable organic group of the same definition as the radical R of the above formula (I) (alkoxysilanes, alkenyloxysilanes, acyloxysilanes, ketiminoxysilanes, alkylaminosilanes and alkylamidosilanes described in particular in U.S. Pat. No. 3,294,725; U.S. Pat. No. 4,584,341; U.S. Pat. No. 4,618,642; U.S. Pat. No. 4,608,412; U.S. Pat. No. 4,525,565; EP-A-387 157; EP-A-340 120; EP-A-364 375; FR-A-1 248 826; FR-1 023 477).

As examples of crosslinking agent (B), mention may be made of:
the following alkoxysilanes:
$Si(OC_2H_5)_4$; $CH_3Si(OCH_3)_3$; $CH_3Si(OC_2H_5)_3$; $(C_2H_5O)_3Si(OCH_3)$; $CH_2=CHSi(OCH_3)_3$; $CH_3(CH_2=CH)Si(OCH_3)_2$; $CH_2=CH(OC_2H_5)_3$; $CH_2=CHSi[ON=C(CH_3)C_2H_5]$; $CH_3Si[ON=C(CH_3)_2]_3$ $CH_3Si[—C(CH_3)=CH_2]_3$; methyltri(N-methylacetamidosilane); methyltris(cyclohexylaminosilane);

or the following products:
a sodium silicate, an alkali metal organosiliconate, a silsesquioxane resin microemulsion, a reactive silicone resin of low molecular mass having alkoxy and acyloxy groups, a silicone resin of high mass insoluble in toluene, at least one hydroxylated silicone resin having, per molecule, at least two different siloxyl units chosen from those of the M, D, T and Q type, at least one being a T or a Q, an alkoxysilane, an alkylaminosilane, an alkylamidosilane, siliconates, silicates and silicas (in powder or colloidal form).

According to one noteworthy provision of the invention, the adhesion promoter (C) or (C') acts as crosslinking agent by itself or together with the crosslinking agent (B).

The dispersion includes at least one filler (D) chosen from:
1) reinforcing siliceous mineral fillers, preferably those chosen from the group comprising: colloidal silica, precipitated silica, pyrogenic silica or mixtures thereof; pyrogenic silica being preferred; these siliceous powders having a BET specific surface area of greater than 50 $m^2/g$, preferably between 150 and 350 $m^2/g$;
2) conventional semireinforcing or bulking mineral fillers, for example those chosen from the group comprising diatomaceous earths, calcium carbonate, ground quartz, carbon black, titanium dioxide, aluminum oxide, hydrated alumina, expanded or unexpanded vermiculite, zinc oxide, mica, talc, iron oxide, barium sulfate, slaked lime, etc.; these semireinforcing or bulking mineral fillers having a particle size generally between 1 and 300 μm and a BET surface area of less than 50 $m^2/g$;
3) organic fillers, preferably consisting of organic copolymers in emulsion, these being known as "latices" or "nanolatices"; these latices or nanolatices being formed, for example, by aqueous dispersions of polymer particles resulting from conventional processes for the emulsion (co)polymerization of one or more polymerisable organic monomers, advantageously chosen from:
   a): alkyl(meth)acrylates, the alkyl part of which preferably comprises from 1 to 18 carbon atoms, particularly methyl acrylate, ethyl acrylate, propyl acrylate, n-butyl acrylate, isobutyl acrylate, amyl acrylate, lauryl acrylate, isolamyl acrylate, 2-ethyl-2-hexyl acrylate, octyl acrylate, methyl methacrylate, chloroethyl methacrylate, butyl methacrylate, 3,3-dimethyl butyl methacrylate, ethyl methacrylate, isobutyl methacrylate, isopropyl methacrylate, phenyl methacrylate, butyl chloroacrylate, methyl chloroacrylate, ethyl chloroacrylate, isopropyl chloroacrylate and cyclohexyl chloroacrylate,
   b): α,β-ethylenically unsaturated esters of monocarboxylic acids, the acid part of which is not polymerisable and the unsaturated part of which preferably contains from 2 to 14 carbon atoms and the acid part contains from 2 to 12 carbon atoms, in particular vinyl acetate, vinyl propionate, vinyl butyrate, an alkyl acetate, vinyl versatate® (registered trademark for esters of $C_9$-$C_{11}$, α-branched acids), vinyl laurate, vinyl benzoate, vinyl trimethylacetate, vinyl pivilate and vinyl trichloroacetate,
   c): esters and half-esters of α,β-ethylenically unsaturated polycarboxylic acids having from 4 to 24 carbon atoms, particularly dimethyl, diethyl maleate, methyl ethyl fumarate and 2-ethyl hexyl fumarate,
   d): vinyl halogens, particularly vinyl chloride, vinyl fluoride, vinylidene chloride and vinylidene fluoride,
   e): vinylaromatics preferably having at most 24 carbon atoms and chosen in particular from styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-tert-butylstyrene, 4-dichlorostyrene, 2,6-dichlorostyrene, 2,5-difluorostyrene and 1-vinylnaphthalene,
   f): conjugated aliphatic dienes preferably having from 3 to 12 carbon atoms, in particular 1,3-butadiene, isoprene and 2-chloro-1,3-butadiene,
   g): α,β-ethylenically unsaturated nitriles preferably having from 3 to 6 carbon atoms, such as acrylonitrile and methacrylonitrile:

at least one of these main monomers a) to g) possibly being copolymerized with up to 40% by weight of at least one other monomer having an ionic character, in particular:
   an abovementioned α,β-ethylenically unsaturated carboxylic acid monomer including monocarboxylic and polycarboxylic acids (acrylic acid, methacrylic acid, maleic acid, itaconic acid, fumaric acid, etc.),
   an ethylenic monomer containing secondary, tertiary or quaternized amine groups (vinyl pyridenes, diethylaminoethyl methacrylate, etc.),
   a sulfonated ethylenic monomer (vinyl sulfonate, styrene sulfonate, etc.),
   a zwitterionic ethylenic monomer (sulfopropyl(dimethylaminopropyl) acrylate) or one having in particular a nonionic character,
   amides of unsaturated carboxylic acids (acrylamide, methacrylamide, etc.),
   esters of polyhydroxypropylated or polyhydroxyethylated alcohols and (meth)acrylates and
   vinylsilanes and/or acrylic silanes (such as, vinyltrimethoxysilane and vinyltriethoxysilane);
4) in the case of the use of a siliceous mineral filler, said filler may advantageously be used in the form of:
   a) a silica suspension treated using an organosilazane in a silicone matrix comprising a linear reactive polyorganosiloxane carrying, for example, a hydroxy group at each chain end, this suspension being obtained by a method consisting essentially in introducing the organosilazane into the preparation medium, on the one hand, before and/or substantially simultaneously with the contacting of at least one part of the silicone matrix used with the particulate filler used, this introduction of the organosilazane being carried out with an organosilazane fraction corresponding to a proportion lying within the range from 8 to 30% by dry weight relative to the silica filler, and, on the other hand, after this contacting of the filler with all or part of the silicone material, this suspension and its method of preparation both being described in international patent application WO-A-00/37549,
   b) an aqueous dispersion obtained:
   by mixing a mixture consisting of:
   100 parts by weight of a silicone phase φs having a dynamic viscosity at 25° C. of at least 10 Pa·s, preferably 50 Pa·s and even more preferably 70 Pa·s, φs comprising the already polymerized oil (A) or mixture of oils (A) and optionally at least one of the constituents (B), (C) or (E);
   0.5-20 parts by weight of at least one emulsifier (F), the HLB of said emulsifier or of the mixture of emulsifiers being at least 10;
   0-100 parts by weight of filler (D);
   2-20 parts by weight of water, the water/water+surfactant(s) weight ratio being such that the viscosity of the water/surfactant(s) mixture is close to or greater than half that of the silicone phase (φs), for a time and under shear conditions sufficient to obtain an "oil in water" emulsion with a particle size of around 0.1 to 5 microns;
   by optional dilution with water until a solids content of 25 to 97% is obtained; and then
   by addition of:
   the constituent(s) not present in the silicone phase φs and/or
   0-100 parts by weight of filler (D), the filler (D) being at least partly in the form of an aqueous colloidal silica suspension introduced in its entirety into the mixing chamber before the emulsion is obtained;

5) in the case of the example of a non siliceous mineral filler, said filler may advantageously be used in the form of a dispersion obtained:
   by producing an emulsion by mixing a mixture consisting of:
   100 parts by weight of a silicone phase ($\phi$s) having a dynamic viscosity at 25° C. of at least 10 Pa·s, preferably 50 Pa·s and even more preferably 70 Pa·s, $\phi$s comprising the already polymerized oil (A) or mixture of oils (A) and optionally at least one of the constituents (B), (C) or (E);
   0.5-20 parts by weight of at least one emulsifier (F), the HLB of said emulsifier or of the mixture of emulsifiers being at least 10;
   0-100 parts by weight of filler (D);
   2-20 parts by weight of water, the water/water+surfactant(s) weight ratio being such that the viscosity of the water/surfactant(s) mixture is close to or greater than half that of the silicone phase ($\phi$s), for a time and under shear conditions sufficient to obtain an "oil in water" emulsion with a particle size of around 0.1 to 5 microns;
   by optional dilution with water until a solids content of 25 to 97% is obtained; and then
   by addition of:
     the constituent(s) not present in the silicone phase ($\phi$s) and/or
     0-100 parts by weight of filler (D), said filler (D) being provided, in the process for obtaining the dispersion, in the form of an aqueous suspension or suspensions of at least one hydrophilic compound, with the condition that, if the filler (D) provided in the process for obtaining the dispersion consists at least partly of at least one aqueous suspension of one or more organic (co)polymers, then at least part of this aqueous suspension (or these aqueous suspensions) of filler (D) is (are) introduced into the mixing chamber before the emulsion is obtained; and 6) the mixtures of fillers (D) of type 1) or type 2) defined above, of fillers (D) of type 1) and type 3) defined above or else of fillers (D) of type 2) and type 3) defined above.

Preferably, the fillers (D) are chosen from the group comprising:
   precipitated silica, pyrogenic silica, carbonates and mixtures thereof;
   colloidal silica; and
   aqueous silica suspensions (or slurries).

According to one variant, these dispersions used for the purpose of the invention may include, in addition to the hydrophilic filler (D) provided in aqueous suspension form, a filler (D') which is implied in the process for obtaining the dispersion, in pulverulent form. This filler (D') introduced in powder form into the mixture resulting in the dispersion is distinguished from the dry hydrophilic filler (D) by its specific surface area Ss (in m2/g), which is small, namely: Ss≦5, preferably Ss≦3.

As examples of pulverulent fillers (D'), mention may be made of: $CaCO_3$, $SiO_2$, $TiO_2$, $Al_2O_3/H_2O$.

Advantageously, the filler (D') may represent 5 to 100 parts by dry weight per 100 parts by weight of silicone phase $\phi$s.

The operation of putting the silicone phase into an "oil in water" emulsion is carried out:

by introducing the silicone oil (A) into a mixture consisting of water and/or aqueous suspension(s) of filler (D)+emulsifier(s) (F); or by introducing water and/or aqueous suspension(s) of filler (D) into a silicone phase ($\phi$s)/emulsifier(s) (F) mixture and mixing at a temperature of around 10 to 50° C.

The viscosity of the aqueous silicone dispersion used for the purpose of the method according to the invention is between 0.1 and 1000 Pa·s, preferably between 10 and 100 Pa·s.

These fillers (D) are introduced into the emulsion in the form of a dry powder or in the form of an aqueous dispersion, for example by simple mixing.

The catalytic curing compounds (E) are well known to a person skilled in the art; these are carboxylic acid salts and halides of metals such as, for example, lead, zinc, zirconium, titanium, iron, barium, calcium, manganese and, most particularly, tin. Mention may be made of:
   products of the reaction between tin dicarboxylate and ethyl polysilicate (U.S. Pat. No. 3,862,919);
   products of the reaction between dibutyltin diacetate and an alkyl silicate or an alkyltrialkoxysilane (BE-A-842 305);
   tin bischelates (EP-A-147 323; 235 049); and
   diorganotin dicarboxylates (GB-A-1 289 900).

They may be used in amounts possibly ranging up to about 3 parts by weight, preferably around 0.05 to 1 part by weight per 100 parts of oil (A).

With regard to the emulsifiers (F), these may be ionic or nonionic surfactants or water-soluble polymers.

Preferably, these are nonionic surfactants. As examples, mention may be made of alkoxylated fatty acids, polyalkoxylated alkylphenols, polyalkoxylated fatty alcohols, polyalkoxylated or polyglycerolated fatty amides, polyglycerolated alcohols and $\alpha$-diols, ethylene oxide/propylene oxide block copolymers and alkylglucosides, alkylpolyglucosides, sugar ethers, sugar esters, sucroglycerides, sorbitan esters and ethoxylated compounds of these sugar derivatives.

As one variant, the emulsifiers (F) are selected from anionic surfactants such as, for example, alkylbenzene sulfonates, alkyl sulfates, alkyl ether-sulfates, alkylaryl ether sulfates and dioctylsulfosuccinates of alkali metals.

The emulsifier(s) (or mixture of emulsifiers) is (are) chosen according to the nature of the silicone oil (A) to be emulsified; in general, an HLB of around 11 to 15 is chosen in order to emulsify a silicone oil (A) consisting of an $\alpha,\omega$-bis(hydroxy) polydimethyl-siloxane polymer. The water/water+emulsifier (s) (F) weight ratio depends on the viscosity of the silicone phase ($\phi$s) and on the nature of the surfactant(s) (or mixture of surfactants); this ratio is, for example, around 20/100 to 70/100, preferably around 25/100 to 60/100, in order to stabilize an emulsion of a silicone phase consisting of an $\alpha,\omega$-dihydroxylated oil having a viscosity of around 30 to 500 Pa·s, using a nonylphenol having 9 or 10 ethoxy units as single emulsifier (F).

With regard to the other functional additives (G) that can be used, these are especially plasticizers and/or salts and/or thickeners and/or filler-dispersing agents, the latter preferably being selected from the group of products having one or more anionic hydrophilic functional groups and even more preferably from the group comprising polyacrylates and/or (poly)phosphates. These additives (G) may also, or more precisely, be:
   plasticizers such as, for example, polydimethylsiloxane oils having a viscosity of around 300 to 10 000 mPa·s, dioctyl phthalates, dialkylbenzenes, optionally in aqueous emulsion, in amounts of 0 to 70 parts by weight per 100 parts by weight of oil (A);

thickeners such as water-soluble polymers of molecular mass greater than 10 000 g/mol such as, for example, alkali metal polyacrylates, polyvinyl alcohols, polyethylene glycols, polyvinylpyrrolidones, carragenans, alginates, methyl celluloses, hydroxyalkyl celluloses and xanthan gum in amounts possibly up to 10% by weight of the final aqueous dispersion;

filler-dispersing agents such as, for example, alkali metal polyacrylates of molecular mass less than 5000 and mineral phosphates in amounts possibly up to 10% by weight of the final aqueous dispersion; and optionally, mineral or organic pigments in an amount of less than 4%, preferably less than 2%, by weight relative to the total mass of the dispersion. These additives (G) may be introduced either into the silicone phase before it is emulsified or into the emulsion before dilution.

The aqueous silicone dispersion (A/B/C/D/E/F/G/H) used in the method according to the invention may, for example, be that described in FR-A-2 753 708 (=WO-A-98/13410).

Having explained in detail the characteristics of the adhesive and of the aqueous silicone dispersion that are used in the method according to the invention, it should be pointed out that the external covering is advantageously chosen from tiles, preferably from tiles based on clay, terracotta, white quartz and inorganic resin adjuvants (powder binder consisting of marble, cement, sand, sandstone, faience and/or pigments).

According to a noteworthy feature of the invention, and taking into account the beneficial performance characteristics of the surface lining produced according to the invention, it is possible to envision the superposition of layers constituting the lining not to include primers whenever the surface to be lined is made of wood.

If the primer turns out to be necessary, it is preferably chosen from the group: polysiloxane resins, aminated organosilanes, epoxy-functionalized organosilanes, isocyanurate-functionalized organosilanes and acrylate-functionalized organosilanes, or mixtures of organosilanes with polyacrylates, or mixtures thereof, the products of the group defined above being dissolved in solvents of the toluene, butanol or glycol ether type. A suitable primer consists, for example, of a solution of a polymethylsiloxane resin in toluene sold by Witco under the name SILQUEST AP 134.

According to another of its aspects, the present invention relates to an adhesive for an impermeable surface lining for buildings (floors/walls/ceilings) that can be used for the implementation as described above, this adhesive being characterized in that it comprises at least one adhesion promoter C', also defined above.

For further details about the other characteristics of the adhesive according to the invention, the reader may refer to the description of the adhesive given above with reference to the method according to the invention.

In practice, the adhesive according to the invention is intended for external coverings, for example of the tiling type, these being fixed to one or more polymer sealing membranes.

The mixing of these ingredients is carried out using any appropriate homogenizing means, for example single-screw or multiple-screw extruders, planetary mixers, hook mixers, slow dispersers, static mixers, blade mixers, propeller mixers, arm mixers or anchor mixers.

Advantageously, the cement, water and adhesion promoter C are mixed just before application.

In practice, the general methodology is as follows:
the surface of the substrate to be lined is made smooth and dust removed therefrom;
the surface is optionally coated with a primer solution;
this is left to dry for several tens of minutes;
the aqueous silicone dispersion is deposited using a brush, in order to form a film, the amount deposited being from 200 to 2000 g/m$^2$, preferably 600 to 1000 g/m$^2$;
the film is left to crosslink/cure for several hours at room temperature;
the tile adhesive is prepared, by adding an adhesion promoter C';
the layer of adhesive to which the adhesion promoter C' has been added is spread over the silicone elastomer sealing membrane; and
the external covering, that is to say for example the tiles, are laid on the adhesive layer.

Yet another subject of the present invention is a ready-to-use kit for implementing the method as defined above. In particular, this kit comprises:
optionally, at least one adhesion primer composition;
at least one aqueous dispersion of one or more silicone oils, comprising:
-A- 100 parts by weight of at least one organopolysiloxane oil (A) that can crosslink by condensation, if necessary in the presence of a crosslinking agent (B), made of an elastomer,
-A'- optionally, up to 30 parts by weight of at least one unreactive organopolysiloxane oil,
-B- if necessary, from 0.1 to 100 parts by weight of at least one crosslinking agent (B),
- C- optionally, up to 50 parts by weight of at least one adhesion promoter (C),
-D- up to 200 parts by dry weight of a filler (D),
-E- a catalytically effective amount of a catalytic curing compound (E), possibly up to three parts by weight,
-F- at least one emulsifier (F),
-G- optionally, at least one functional additive (G) and
-H- water;

said dispersion making it possible to obtain, after coating onto a substrate and crosslinking, an impermeable membrane;
at least one adhesive as defined above; and
optionally, at least one external covering.

The external covering, that is to say for example the tiles, may or may not form part of the kit according to the invention.

This kit, which comprises at least the products for making the surface lining adhere and for making it permeable to water, is in the form of a package containing, within one and the same commercial entity, these elements for producing the impermeable surface lining.

According to one variant, the products for implementing the method according to the invention could be packaged and sold separately.

The invention also relates to the use:
of an aqueous silicone oil dispersion comprising:
-A- 100 parts by weight of at least one organopolysiloxane oil (A) that can crosslink by condensation, if necessary in the presence of a crosslinking agent (B), made of an elastomer,
-A'- optionally, up to 30 parts by weight of at least one unreactive organopolysiloxane oil,
-B- if necessary, from 0.1 to 100 parts by weight of at least one crosslinking agent (B),
-C- optionally, up to 50 parts by weight of at least one adhesion promoter (C),
-D- up to 200 parts by dry weight of a filler (D), -E- a catalytically effective amount of a catalytic curing compound (E), possibly up to three parts by weight,
-F- at least one emulsifier (F),
-G- optionally, at least one functional additive (G) and
-H- water; and
of an adhesive for the external covering (for example tiles) comprising at least one adhesion promoter C' as defined above;

for the production of an impermeable surface lining for buildings (floors/walls/ceilings), said lining consisting of a superposition comprising starting from the surface to be lined:
optionally, at least one layer of adhesion primer;
at least one water-impermeable polymeric membrane;
(optionally, at least one sheet of woven or nonwoven fibrous material);
at least one layer of adhesive;
at least one external covering.

The tile adhesive and the aqueous silicone dispersion for obtaining the impermeable silicone elastomer membrane are as defined in the above description.

Thanks to the proposed operating methods and products according to the invention, an impermeable surface lining can be produced rapidly, easily and with a guarantee of good adhesion and retention of sealing over time, without incurring ecotoxicity and allowing the tools used for the application to be simply washed with water.

In addition, application is conceivable even in the presence of water appearing only three hours after coating of the impermeable silicone elastomer film as it undergoes curing/crosslinking.

A clearer understanding of the invention and its advantages will be gained from the following examples, which describe the preparation of the aqueous silicone dispersion used in the method in order to obtain the impermeable silicone elastomer membrane.

These examples also present one specific case of how to produce an impermeable surface lining using the abovementioned aqueous silicone dispersion, an adhesive to which an adhesion promoter has been added, and an external covering of the tiling type.

EXAMPLE 1

Preparation of a crosslinkable aqueous silicone dispersion (ABCDEFGH) and formation of an impermeable silicone elastomer membrane using this dispersion.

The following were introduced into a 2-1 anchor mixer: (A) 347.7 g of hydroxylated α,ω-polydimethylsiloxane oil of 135000 mPa·s viscosity; (A') 26.2 g of polydimethylsiloxane oil blocked by methyl groups, of 100 mPa·s viscosity; (B) 3.7 g of hydroxylated MDT resin (containing 0.5% by weight of hydroxyl groups, 62% by weight of trifunctional units, 24% by weight of difunctional units and 14% by weight of monofunctional units) of 1000 mPa·s viscosity; (F) 26.4 g of RHODASURF ROX (an 85% aqueous solution of a polyethoxylated $C_{13}$ aliphatic alcohol containing about 8 ethylene oxide units); and (H) 7.9 g of demineralized water.

The ingredients were mixed at 100 rpm until a fine O/W emulsion (mean diameter≦0.6 μm) was obtained.

The emulsion was diluted with (H) 8.2 g of demineralized water and then the following were added, with stirring at 100 rpm: (D) 7.9 g of precolor pigment V5639 sold by Wünsiedel predispersed in 9 g of sodium polyacrylate (a dispersant sold by Coatex under the name COATEX P50 or by Protex under the name PROX A11); and (C) 24.3 g of a 77 wt % aqueous solution of a T(OH) resin aminated by aminopropyl groups, sold by Witco under the name VS 142.

Dispersed into the mixture thus obtained were (D) 186.9 g of pyrogenic carbonate sold by Omya under the name BLR3 and 186.9 g of precipitated carbonate sold by Solvay under the name SOCAL 312, with stirring at 100 rpm.

Finally, the following were introduced into the mixture: (G) 0.4 g of a fungicide; then (H) 9 g of demineralized water; and (E) 1.2 g of a 60 wt % dioctyltin dilaurate solution, mixing taking place under vacuum (4600 Pa) and with moderate stirring of 100 rpm.

The solids content of such a formulation was 79%.

A film was prepared using a 2.5 mm doctor blade filled with the desired product. This method made it possible to obtain a film with a thickness of 2 (±0.3) mm.

The product was left to crosslink for 7 days at 23° C. and 50% relative humidity.

The mechanical properties obtained on this 2 mm film under such conditions were the following:

TABLE I

| | BAL-WP1 acrylic membrane of the prior art | Silicone elastomer membrane used in the invention |
|---|---|---|
| Tensile strength (MPa) (NF T 46-002 standard) | 0.25 | 0.65 |
| Elongation at break (%) (NF T 46-002 standard) | 90 | 560 |
| 100% Modulus (MPa) (NF T 46-002 standard) | 0.20 | 0.32 |
| Shore A hardness (NF T 51-109 standard) | 38 | 20 |

The silicone elastomer membrane according to the invention has mechanical properties that are markedly superior to the acrylic sealing membrane sold by BAL under the name BAL-WP1 according to the prior art.

EXAMPLE 2

The following were introduced into a 2-1 anchor mixer: (A) 348.8 g of hydroxylated α,ω-polydimethylsiloxane oil of 135000 mPa·s viscosity; (A') 26.3 g of polydimethylsiloxane oil blocked by methyl groups, of 100 mPa·s viscosity; (B) 3.8 g of hydroxylated MDT resin (containing 0.5% of hydroxylated groups, 60% of trifunctional units, 25% of difunctional units and 15% of monofunctional units) of 1000 mPa·s viscosity; (F) 26.4 g of RHODASURF ROX (an 85% aqueous solution of a polyethoxylated $C_{13}$ aliphatic alcohol containing about 8 ethylene oxide units); and (H) 7.9 g of demineralized water.

The ingredients were mixed at 100 rpm until a fine O/W emulsion (mean diameter≦0.6 μm) was obtained.

The mixture was diluted with (H) 8.25 g of demineralized water and then the following were added, with stirring at 100 rpm: (D) 4.9 g of precolor pigment V5672 sold by Wünsiedel predispersed in 9 g of sodium polyacrylate (a dispersant sold by Coatex under the name COATEX P50 or by Protex under the name PROX A11); and (C) 24.4 g of a 77 wt % aqueous solution of a T(OH) resin aminated by aminopropyl groups, sold by Witco under the name VS 142.

(D) 187.5 g of pyrogenic carbonate, sold by Omya under the name BLR3 and 187.5 g of precipitated carbonate sold by Solvay under the name SOCAL 312, were dispersed with stirring at 100 rpm.

Finally, (G) 0.4 g of a fungicide was introduced followed by (H) 9 g of demineralized water and (E) 1.2 g of a 60% dioctyltin dilaurate solution, and these were mixed under vacuum (46 mbar) with moderate stirring of 100 rpm.

The solids content of such a formulation was 79%.

The mechanical properties obtained on a 2 mm film of this product under the same conditions as example 1 were the following:

TABLE II

|  | Silicone elastomer membrane used in the invention |
|---|---|
| Tensile strength (MPa) (NF T 46-002 standard) | 0.63 |
| Elongation at break (%) (NF T 46-002 standard) | 550 |
| 100% Modulus (MPa) (NF T 46-002 standard) | 0.34 |
| Shore A hardness (NF T 51-109 standard) | 22 |

EXAMPLE 3

About 0.1 g of an adhesion primer, consisting of a solution of polymethylsiloxane resin in toluene sold by Witco under the name SILQUEST AP 134, was applied to a concrete slab having dimensions of 75×50×20 mm using a brush. After leaving this to dry for 30 minutes, the aqueous silicone dispersion prepared in example 1 was deposited using a brush. The amount used, per layer, could vary from 600 to 1000 g/m$^2$ depending on the porosity and the roughness of the substrate and on the nature of the parts to be treated. In this case, the amount of coating was 800 g/m$^2$. This was left to dry for 24 h in a 23° C./50% relative humidity environment, and then the tile adhesive, to which 8% of an adhesion promoter (C') consisting of a 77 wt % aqueous solution of a T(OH) resin aminated by aminopropyl groups sold by Witco under the name VS 142 had been added, was applied, a tile having the dimensions of 50×50 mm being laid on said adhesive.

Preparation and Application of the Adhesive:

Into 100 g of base, as regards adhesive sold by BAL under the name BAL-SINGLE PART FLEXIBLE, were added 10 g of a 77 wt % aqueous solution of a T(OH) resin aminated by aminopropyl groups sold by Witco under the name VS 142 and 8 g of water.

An approximately 2 to 6 mm layer of adhesive was deposited using a spreader (notched or unnotched), this representing 5 to 6 kg/m$^2$.

The whole system was left to dry for 48 h in a room conditioned to 23° C. and 50% relative humidity, and then the force required to pull the tile off was measured.

To do this, a tensile testing machine having jaws capable of holding test pieces of such dimensions was used. An anodized aluminum plate was stuck to the tile so as to be able to impose a tensile force on the system. The pull speed was 5.5 mm/min (according to the ISO 8339 standard).

The measured force was 0.6 MPa, this being greater than the required force of 0.5 MPa.

EXAMPLE 4

About 0.1 g of an adhesion primer, consisting of a solution of polymethylsiloxane resin in toluene sold by Witco under the name SILQUEST AP 134, was applied to a concrete slab having dimensions of 75×50×20 mm using a brush. After leaving this to dry for 30 minutes, the aqueous silicone dispersion prepared in example 1 was deposited using a brush. The amount used, per layer, could vary from 600 to 1000 g/m$^2$ depending on the porosity and the roughness of the substrate and on the nature of the parts to be treated. In this case, the amount of coating was 800 g/m$^2$. This was left to dry for 24 h in a 23° C./50% relative humidity environment.

This system was placed in a column of water 220 mm in height and 10 mm in diameter for 5 days. The movement of the water level in the column after this conditioning operation was observed.

The water level in the column did not drop in 5 days, which means that the polymer membrane provides a good seal.

The invention claimed is:

1. A method of producing an impermeable surface lining for buildings, the method comprising fixing, to a building surface, a superposition of layers or of elements comprising, starting from the surface:
    optionally, at least one layer of adhesion primer;
    at least one water-impermeable polymeric membrane;
    optionally, at least one sheet of woven or nonwoven fibrous material;
    at least one layer of adhesive;
    at least one external covering;
wherein:
    a. the impermeable membrane is obtained from an aqueous dispersion of silicone oil(s) comprising:
        -A- 100 parts by weight of at least one organopolysiloxane oil (A) that can crosslink by condensation, if necessary in the presence of a crosslinking agent (B), made of an elastomer,
        -A'- optionally, up to 30 parts by weight of at least one unreactive organopolysiloxane oil,
        -B- if necessary, from 0.1 to 100 parts by weight of at least one crosslinking agent (B),
        -C- optionally, up to 50 parts by weight of at least one adhesion promoter (C),
        -D- up to 200 parts by dry weight of at least one filler (D),
        -E- a catalytically effective amount of a catalytic curing compound (E), optionally up to three parts by weight,
        -F- at least one emulsifier (F),
        -G- optionally, at least one functional additive (G) and
        -H- water;
    b. the adhesive employed includes at least one adhesion promoter (C');
    c. the aqueous silicone oil(s) dispersion is applied as a film to the surface;
    d. the crosslinking of the silicone film then takes place, preferably at room temperature;
    e. at least one layer of adhesive, to which the adhesion promoter C' has been added, is then applied, by coating it onto the crosslinked silicone film; and then, finally
    f. the external covering is laid, wherein the external covering is a tile.

2. The method as claimed in claim 1, wherein the amount of adhesion promoter (C') in the adhesive is less than 20% by weight.

3. The method as claimed in claim 1, wherein the adhesion promoter (C') is identical to (C) when (C) is present.

4. The method as claimed in claim 1, wherein the adhesion promoter (C) and/or (C') is a water-soluble compound capable of being dissolved in water at a temperature of 25° C. in an amount of at least 5% by weight, and selected from silanes and/or hydroxylated POSs carrying, per molecule, at least one hydroxyl group and at least one hydrophilic substrate-anchoring functional group ($F_{sa}$), and from mixtures of these products, said $F_{sa}$ functional groups, which are identical or different from one another, comprising the following functional groups: amino, epoxy, acrylo, methacrylo, ureido, mercapto, thiol or chloroalkyl.

5. The method as claimed in claim 1, wherein the adhesion promoter (C) or (C') is:
a linear hydroxylated polydiorganosiloxane having D and/or MD siloxyl units and/or a hydroxylated POS resin comprising T and optionally M and/or D and/or Q siloxyl units or else Q and M and/or D and/or T siloxyl units; and/or
a silane having as formula:

in which formula:
c is 0, 1 or 2;
the radicals $R^5$ are identical or different and represent alkyl, aminoalkyl, polyaminoalkyl, epoxyalkyl or alkenyl aliphatic organic groups comprising from 1 to 13 carbon atoms, or aryl aromatic groups comprising from 6 to 13 carbon atoms; and
the radical R is an OH group.

6. The method as claimed in claim 1, wherein the oils (A) have as generic formula (I):

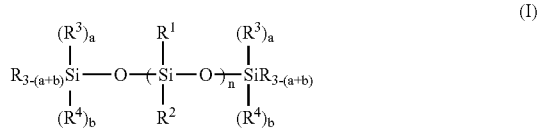

in which formula:
a is 0 or 1;
b is 0 or 1;
with a+b=0, 1 or 2;
n has a value high enough to give the polymer of formula (a) the desired viscosity;
the R radicals are identical or different and represent:
an OH group with a+b=2,
an alkoxy or alkenyloxy group comprising from 1 to 10 carbon atoms;
an aryloxy group comprising from 6 to 13 carbon atoms,
an acyloxy group comprising from 1 to 13 carbon atoms,
a ketiminoxy group comprising from 1 to 8 carbon atoms or
an amino-functional or amido-functional group comprising from 1 to 6 carbon atoms, linked to the silicon via an Si—N bond;
the $R^1$ and $R^2$ radicals are identical or different and represent alkyl or alkenyl aliphatic organic groups comprising from 1 to 10 carbon atoms, phenyl aromatic groups, said groups being optionally substituted with halogen atoms or cyano groups;
the $R^3$ and $R^4$ radicals are identical or different and represent alkyl, aminoalkyl, polyaminoalkyl, epoxyalkyl or alkenyl aliphatic organic groups comprising from 1 to 13 carbon atoms, or aryl aromatic groups comprising from 6 to 13 carbon atoms;
optionally, at least 80% of the radicals $R^1$ to $R^4$ representing a methyl group and at least two condensable functional groups, being present per molecule; and in that:
the adhesion promoter (C) when present acts as a crosslinker, by itself or in combination with the crosslinking agent (B) formed by:
sodium silicate, an alkali metal organosiliconate, a silsesquioxane resin microemulsion, a reactive silicone resin of low molecular mass having alkoxy and acyloxy groups, a silicone resin of high mass insoluble in toluene, at least one hydroxylated silicone resin having, per molecule, at least two different siloxyl units selected from those of the M, D, T and Q type; at least one being a T or a Q; an alkoxysilane, an alkylaminosilane, an alkylamidosilane; siliconates, silicates and silicas (in powder or colloidal form); and in that:
the catalytic curing compound (E) is a tin derivative used in amounts optionally up to 0.05 to 1 part by weight per 100 parts of oil (A).

7. The method as claimed in claim 1, wherein the surface is made of wood and in that the superposition includes no primer.

8. A method of producing an impermeable surface lining for buildings, the method comprising fixing, to a building surface, a superposition of layers or of elements comprising, starting from the surface:
optionally, at least one layer of adhesion primer;
at least one water-impermeable polymeric membrane;
optionally, at least one sheet of woven or nonwoven fibrous material;
at least one layer of adhesive;
at least one external covering;
wherein:
a. the impermeable membrane is obtained from an aqueous dispersion of silicone oil(s) comprising:
-A- 100 parts by weight of at least one organopolysiloxane oil (A) that can crosslink by condensation, if necessary in the presence of a crosslinking agent (B), made of an elastomer,
-A'- optionally, up to 30 parts by weight of at least one unreactive organopolysiloxane oil,
-B- if necessary, from 0.1 to 100 parts by weight of at least one crosslinking agent (B),
-C- optionally, up to 50 parts by weight of at least one adhesion promoter (C),
-D- up to 200 parts by dry weight of at least one filler (D),
-E- a catalytically effective amount of a catalytic curing compound (E), optionally up to three parts by weight,
-F- at least one emulsifier (F),
-G- optionally, at least one functional additive (G) and
-H- water;
b. the adhesive employed includes at least one adhesion promoter (C');
c. the aqueous silicone oil(s) dispersion is applied as a film to the surface;
d. the crosslinking of the silicone film then takes place, preferably at room temperature;
e. at least one layer of adhesive, to which the adhesion promoter C' has been added, is then applied, by coating it onto the crosslinked silicone film; and then, finally
f. the external covering is laid, wherein the adhesive employed is prepared by mixing a powder part with a liquid dispersant, and in that the adhesion promoter (C') is incorporated into the liquid dispersant.

9. A method of producing an impermeable surface lining for buildings, the method comprising fixing, to a building surface, a superposition of layers or of elements comprising, starting from the surface:

optionally, at least one layer of adhesion primer;
at least one water-impermeable polymeric membrane;
optionally, at least one sheet of woven or nonwoven fibrous material;
at least one layer of adhesive;
at least one external covering;
wherein:
  a. the impermeable membrane is obtained from an aqueous dispersion of silicone oil(s) comprising:
    -A- 100 parts by weight of at least one organopolysiloxane oil (A) that can crosslink by condensation, if necessary in the presence of a crosslinking agent (B), made of an elastomer,
    -A'- optionally, up to 30 parts by weight of at least one unreactive organopolysiloxane oil,
    -B- if necessary, from 0.1 to 100 parts by weight of at least one crosslinking agent (B),
    -C- optionally, up to 50 parts by weight of at least one adhesion promoter (C),
    -D- up to 200 parts by dry weight of at least one filler (D),
    -E- a catalytically effective amount of a catalytic curing compound (E), optionally up to three parts by weight,
    -F- at least one emulsifier (F),
    -G- optionally, at least one functional additive (G) and
    -H- water;
  b. the adhesive employed includes at least one adhesion promoter (C');
  c. the aqueous silicone oil(s) dispersion is applied as a film to the surface;
  d. the crosslinking of the silicone film then takes place, preferably at room temperature;
  e. at least one layer of adhesive, to which the adhesion promoter C' has been added, is then applied, by coating it onto the crosslinked silicone film; and then, finally
  f. the external covering is laid, wherein the adhesive used has the following composition (in parts by weight):

| | |
|---|---|
| hydraulic cement | 100 |
| mineral binder with organic or inorganic additive(s) | 100-300 |
| adhesion promoter (C') | 1-50 |
| water | 20-100. |

10. The method as claimed in claim 9, wherein the mineral binder comprises at least one compound selected from the group consisting of a siliceous sand, a cellulose derivative, a calcareous filler, an acrylic resin in dispersion, a specific adjuvant and mixtures thereof.

11. A method of producing an impermeable surface lining for buildings, the method comprising fixing, to a building surface, a superposition of layers or of elements comprising, starting from the surface:
optionally, at least one layer of adhesion primer;
at least one water-impermeable polymeric membrane;
optionally, at least one sheet of woven or nonwoven fibrous material;
at least one layer of adhesive;
at least one external covering;
wherein:
  a. the impermeable membrane is obtained from an aqueous dispersion of silicone oil(s) comprising:
    -A- 100 parts by weight of at least one organopolysiloxane oil (A) that can crosslink by condensation, if necessary in the presence of a crosslinking agent (B), made of an elastomer,
    -A'- optionally, up to 30 parts by weight of at least one unreactive organopolysiloxane oil,
    -B- if necessary, from 0.1 to 100 parts by weight of at least one crosslinking agent (B),
    -C- optionally, up to 50 parts by weight of at least one adhesion promoter (C),
    -D- up to 200 parts by dry weight of at least one filler (D),
    -E- a catalytically effective amount of a catalytic curing compound (E), optionally up to three parts by weight,
    -F- at least one emulsifier (F),
    -G- optionally, at least one functional additive (G) and
    -H- water;
  b. the adhesive employed includes at least one adhesion promoter (C');
  c. the aqueous silicone oil(s) dispersion is applied as a film to the surface;
  d. the crosslinking of the silicone film then takes place, preferably at room temperature;
  e. at least one layer of adhesive, to which the adhesion promoter C' has been added, is then applied, by coating it onto the crosslinked silicone film; and then, finally
  f. the external covering is laid, wherein the external covering is a tile selected from the group consisting of a clay tile, a terracotta tile, a white quartz tile, and an inorganic resin adjuvant tile.

* * * * *